United States Patent
Shinya et al.

(10) Patent No.: US 10,875,580 B2
(45) Date of Patent: Dec. 29, 2020

(54) VEHICLE FRONT STRUCTURE

(71) Applicant: TOYOTA JIDOSHA KABUSHIKI KAISHA, Toyota (JP)

(72) Inventors: Toshiharu Shinya, Toyota (JP);
Yoshinori Domon, Nagoya (JP);
Haruhiko Yamamoto, Miyoshi (JP);
Akira Sabu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 16/373,706

(22) Filed: Apr. 3, 2019

(65) Prior Publication Data
US 2019/0315410 A1 Oct. 17, 2019

(30) Foreign Application Priority Data

Apr. 11, 2018 (JP) .................................. 2018-076318

(51) Int. Cl.
*B62D 25/08* (2006.01)
*B62D 21/15* (2006.01)

(52) U.S. Cl.
CPC ........... *B62D 25/08* (2013.01); *B62D 21/152* (2013.01)

(58) Field of Classification Search
CPC ................ B62D 25/085; B62D 21/152; B62D 296/1871; B60R 2021/0009; B60R 2021/0023; B60R 2019/247
USPC .......................................... 296/187.09, 187.1
See application file for complete search history.

(56) References Cited

U.S. PATENT DOCUMENTS

| | | | |
|---|---|---|---|
| 8,764,096 B2* | 7/2014 | Han | B60R 19/18 |
| | | | 296/133 |
| 9,315,167 B1* | 4/2016 | Hardy | B62D 25/082 |
| 9,555,756 B2* | 1/2017 | Sugano | F16F 7/12 |
| 9,650,076 B2* | 5/2017 | Higuchi | B62D 25/085 |
| 9,925,937 B2* | 3/2018 | Watanabe | B62D 25/08 |
| 10,604,189 B2* | 3/2020 | Sekiya | B62D 27/02 |
| 2015/0014084 A1* | 1/2015 | Iwama | B60R 19/34 |
| | | | 180/312 |
| 2016/0280272 A1* | 9/2016 | Haga | B62D 21/152 |
| 2016/0318552 A1* | 11/2016 | Matsumoto | B62D 25/082 |
| 2017/0021868 A1 | 1/2017 | Watanabe et al. | |
| 2018/0244225 A1* | 8/2018 | Nakayama | B62D 21/152 |
| 2018/0370571 A1* | 12/2018 | Sekiya | B62D 27/02 |
| 2019/0126983 A1* | 5/2019 | Okura | B62D 21/155 |

FOREIGN PATENT DOCUMENTS

JP 2017-024552 A 2/2017

* cited by examiner

*Primary Examiner* — Hilary L Gutman
(74) *Attorney, Agent, or Firm* — Oliff PLC

(57) ABSTRACT

A motor vehicle includes a front side member disposed on each of opposite lateral sides in a front portion of a vehicle, and a crash box disposed forward of the front side member. The crash box extends further outward in a vehicle width direction with respect to the front side member. The motor vehicle further includes a triangular gusset attached to the front side member and the crash box. The triangular gusset includes an oblique portion extending diagonally forward from where the triangular gusset is joined to the front side member. A reinforcing patch is further disposed close to the triangular gusset along the oblique portion of the triangular gusset. This vehicle structure enables transmission to the front side member of a load input to the gusset, which is greater than an assumed load.

4 Claims, 4 Drawing Sheets

VEHICLE FRONT STRUCTURE

CROSS REFERENCE TO RELATED APPLICATION

This application claims priority to Japanese Patent Application No. 2018-076318 filed on Apr. 11, 2018, which is incorporated herein by reference in its entirety including the specification, claims, drawings, and abstract.

TECHNICAL FIELD

The present disclosure relates to a front structure of a vehicle including front side members.

BACKGROUND

Vehicle structures may include front side members on opposite lateral sides in front portions of vehicles.

Patent Document 1 indicated below describes a structure of a vehicle including front side members, crash boxes having wider widths than the front side members and disposed on front ends of the respective front side members, and a bumper reinforcement disposed on front ends of the crash boxes for coupling the crash boxes on right and left sides. The structure further includes triangular coupling members called triangular gussets at locations where the front side members and the crash boxes are respectively coupled together. The triangular gusset has a triangle shape including one side joined to an outer portion of the front side member in the vehicle width direction and another side joined to a rear portion of the crash box.

A load from the front applied to this vehicle due to a small overlap crash against a barrier causes the triangular gusset to transmit the load exerted from the crash box toward the front side member. The front side member, upon increase in the transmitted inward load in the vehicle width direction, causes inward folding near a point where the load is input. The front side member, which is thus folded inwardly, presses a cross member disposed inward of the front side member to thereby transmit the load to the front side member on the opposite side of the vehicle. Thus, a generally lateral force is exerted to the vehicle to move the vehicle away from the impacting barrier.

CITATION LIST

Patent Literature

[Patent Document 1] JP 2017-24552 A

SUMMARY

In the vehicle described in Patent Document 1, properties of the members and structures are determined so that they can adapt to loads of assumed magnitudes. Therefore, some members or structures may be unable to adapt to a load that is increased with an increase in the weight of the vehicle.

Embodiments of the disclosure are directed toward providing a vehicle structure capable of transmitting to a front side member a load input to a gusset and having a magnitude that is greater than an assumed magnitude.

In accordance with one aspect of the disclosure, a vehicle front structure includes a front side member disposed on each of opposite lateral sides in a front portion of a vehicle, a load transmission member disposed forward of the front side member and including a wide portion extending further outward with respect to the front side member and transmitting rearward a load applied from forward, a gusset having a rear end attached to an outer side face of the front side member and having an oblique portion extending forward and outward from the rear end, which has a front end that is attached to a rear face of the wide portion of the load transmission members, and a reinforcement attached to the oblique portion of the gusset and having a shape extending from a vicinity of the rear end toward a front end of the gusset.

The vehicle front structure described above may further include a side-member-side-member load transmission member disposed inward of the front side members on the opposite lateral sides, which is configured to transmit a load between the front side members. The side-member-side-member load transmission member may include, on faces opposite the respective front side members, recessed portions each extending along a vehicle height and being disposed further rearward with respect to a portion of the front side member where the rear end of the gussets is attached.

In the vehicle front structure described above, the reinforcement may include a three-dimensional combination of at least two plates.

The structure according to an embodiment uses the reinforcement to supplement the strength of the gusset. If the gusset and the reinforcement input loads at the same location on the front side member, the input points can be focused. If the gusset and the reinforcement input loads at different adjacent locations on the front side member, the load can be transmitted while taking a longer time than when the loads are input to the same location.

The structure according to an embodiment allows the front side member that is folded inwardly to come into contact with the recessed portion of the side-member-side-member load transmission member. This enables efficient input of the load to the front side member and further enables efficient transmission of the load to the front side member on the opposite side.

The structure according to an embodiment increases the strength of the reinforcement against the load, enabling transmission of large loads.

BRIEF DESCRIPTION OF DRAWINGS

Embodiment(s) of the present disclosure will be described by reference to the following figures, wherein.

DESCRIPTION OF EMBODIMENTS

Embodiments of the disclosure will be described by reference to the drawings. While in the following description, specific embodiments are explained for ease of understanding, there are only examples and various other embodiments may be adopted.

Figure 1:
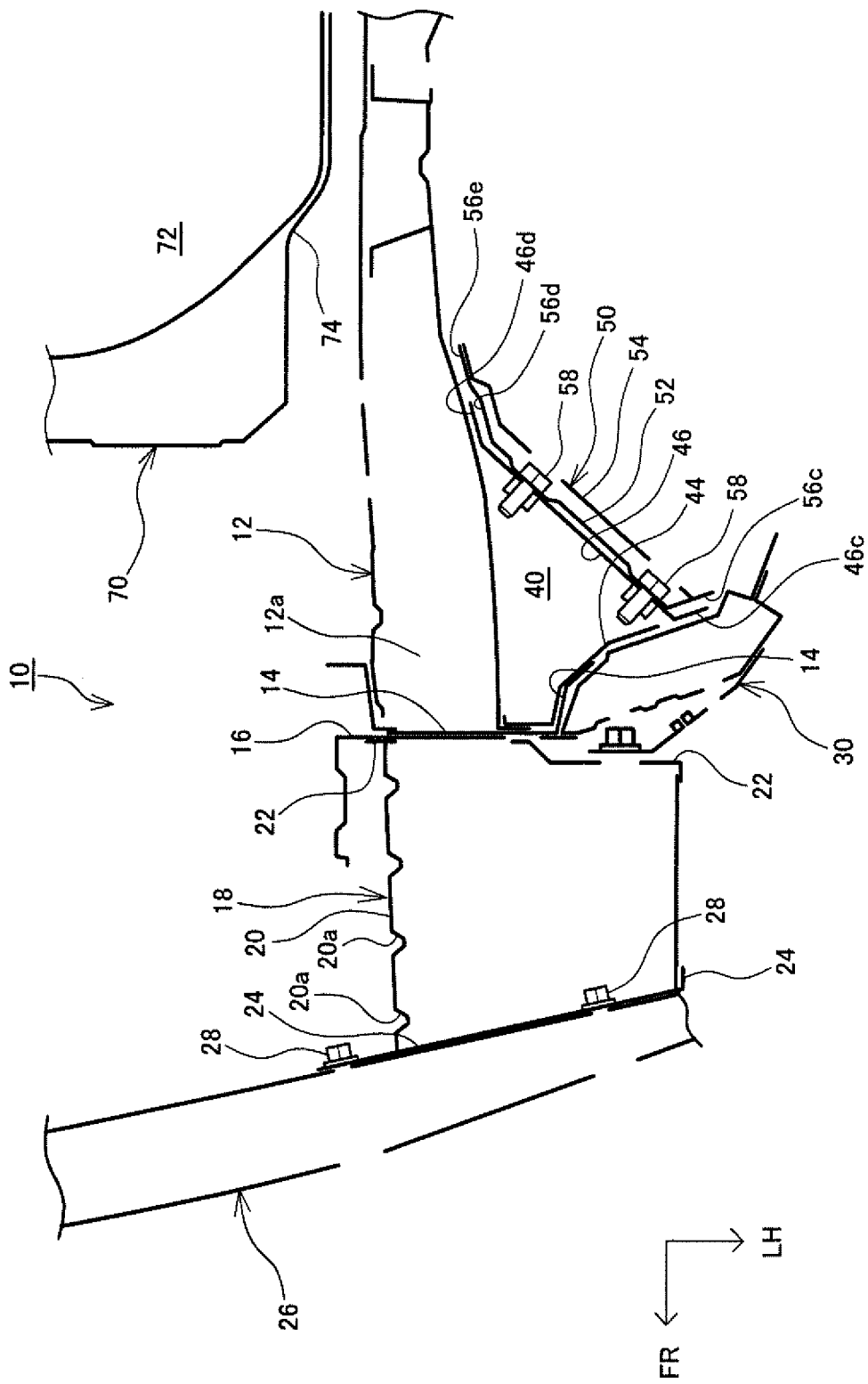
FIG. 1 is a diagram schematically illustrating a portion around the front left side of a motor vehicle according to an embodiment.

FIG. 1 is an end view schematically illustrating a part of a frame structure of a motor vehicle 10 according to an embodiment. In FIG. 1, an arrow FR indicates forward in the travelling direction (forward in the vehicle length direction), and an arrow LH indicates leftward in the travelling direction (leftward in the vehicle width direction). Plate-like members which are shown in solid lines in the drawing actually have certain thicknesses. It should be also noted that a plate-like member may be illustrated as separate members because fastening members such as bolts and nuts are not shown in the drawing.

The motor vehicle 10 uses a driving motor as a drive source. The motor vehicle 10 includes a front side member 12 extending along the vehicle length on the left side in the vehicle width direction in a front portion of the vehicle. The front side member 12 forms a pair with a front side member disposed on the right side in vehicle width direction, which is not shown, to form a part of the frame structure of the motor vehicle 10. The front side member 12 is formed of a combination of two bent steel plates and has a rectangular cross section. The front side member 12 has a front portion 12a that expands slightly further outward in the vehicle width direction than its rear portion.

A first connection plate 14 made of a steel plate is joined to a front end of the front side member 12. The first connection plate 14, in turn, is joined to a radiator support 16 disposed forward of the first connection plate 14. The radiator support 16 is made of a steel plate and supports a radiator disposed in the front portion of the vehicle.

The motor vehicle further includes, forward of the radiator support 16, a crash box 18 which serves as both an impact absorption member and a load transmission member. The crash box 18 includes a body part 20, a second connection plate 22 on a rear face of the body part 20, and a third connection plate 24 on a front face of the body part 20. The body part 20 is formed of a combination of bent steel plates into a hollow rectangular column, with its length direction being directed in the length direction of the motor vehicle 10. The body part 20 has a greater width than the front side member 12. Specifically, the inward side face of the body part 20 in the vehicle width direction and the inward side face of the front side member 12 in the vehicle width direction are substantially aligned. However, the outward side face of the body part 20 in the vehicle width direction forms a wide portion which expands further outward with respect to the outward side face of the front side member 12 in the vehicle width direction. The side faces of the body part 20 include a plurality of recessed beads 20a that serve as start points of plastic deformation under impact. The second connection plate 22 and the third connection plate 24 made of steel plates are welded to the rear face and front face of the body part 20, respectively. The second connection plate 22 is further joined to the radiator support 16 by fastening bolts and nuts.

The motor vehicle further includes a bumper reinforcement 26 on the front end of the crash box 18. The bumper reinforcement 26 is formed of a steel plate which is bent into a hat shape, and extends long in the vehicle width direction. While the bumper reinforcement 26 is substantially parallel to the vehicle width direction around its center in the vehicle width direction, opposite ends of the bumper reinforcement 26 in the vehicle width direction are gently curved such that a portion of the bumper reinforcement 26 closer to the each end is located further rearward in the motor vehicle 10. The rear face of the bumper reinforcement 26 is fastened to the third connection plate 24 of the crash box 18 with bolts and nuts 28 on the left side in the vehicle width direction, and is similarly fastened to the third connection plate of the crash box on the right side in the vehicle width direction.

The motor vehicle further includes, behind a portion of the crash box 18 located outward in the vehicle width direction, an outrigger 30 attached to a separate frame structure. The outrigger 30, which is rigid and would not be easily collapsed by load, functions as a load transmission member. The outrigger 30 is separated, at a small interval, from the crash box 18 disposed forward of the outrigger 30. The outrigger 30 is welded to the first connection plate 14 and the triangular gusset 40 disposed rearward of the outrigger 30. The outrigger 30 is a load transmission member disposed further outward with respect to the front side member 12, and forms a wide portion similar to the outward portion of the crash box 18.

Figure 2:
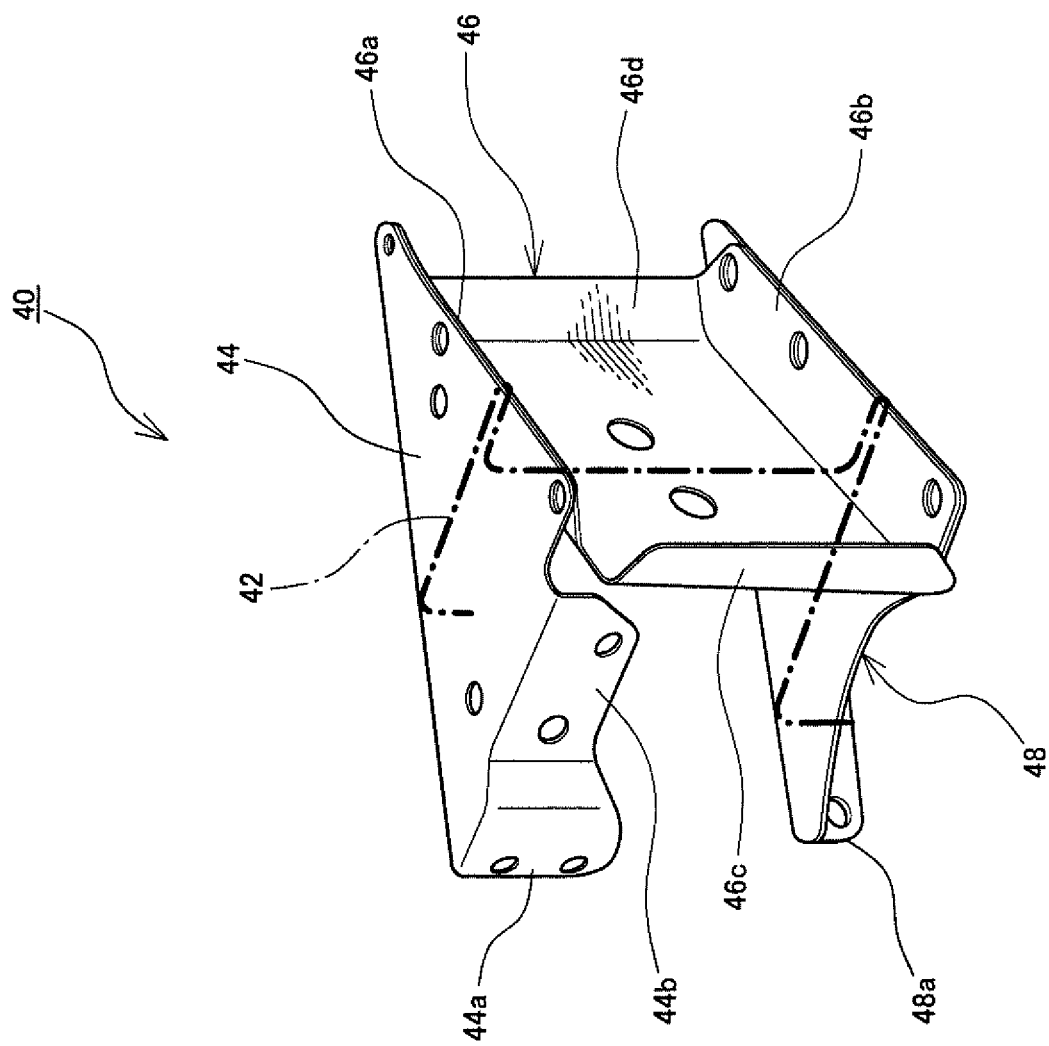
FIG. 2 is a perspective view of a triangular gusset according to the embodiment.

A triangular gusset 40 is a coupling member (gusset) having a triangular shape, which couples the front side member 12, the crash box 18, and the outrigger 30 together. FIG. 2 is a perspective view of the triangular gusset 40, and also shows a cross sectional shape by a dot-dash line 42. The triangular gusset 40 is formed of three steel plates; that is, a top plate 44, a side plate 46, and a bottom plate 48, which are welded together. The schematic view in FIG. 1 shows an end face of the triangular gusset 40 taken along height including only the top plate 44 and the side plate 46.

As illustrated in FIG. 2, the top plate 44 has a substantially triangular shape and includes, toward further depth in FIG. 2, a flange that is welded to a side face of the front side member 12. The top plate 44 further includes flanges 44a and 44b that are welded to the first connection plate 14. The flange 44a is located at a position that is directly contiguous to the body part 20 of the crash box 18 and the flange 44b is located at a position that is adjacent to the outrigger 30.

The side plate 46 has a substantially rectangular shape, and includes flanges 46a, 46b, 46c, and 46d on its four sides, respectively. The flange 46a is welded to the top plate 44, and the flange 46b is welded to the bottom plate 48. The flange 46c is joined to the outrigger 30 by welding, for example. The flange 46d is disposed to apply a load to the side face of the front side member 12, and is welded to the front side member 12.

The bottom plate 48 has a triangular shape similar to that of the top plate 44. The bottom plate 48 includes a flange 48a that is welded to the side face of the front side member 12.

The triangular gusset 40 serves to input a load from the front of the vehicle to the side face of the front side member 12 in a frontal crash, as will be described below. At this time, the crash box 18 and the outrigger 30, serving as load transmission members, transmit the load applied from the front to the triangular gusset 40. The triangular gusset 40 forms an oblique portion extending further outward in the vehicle width direction toward the front portion of the vehicle, as viewed from the rear end of the portion where the triangular gusset 40 and the front side member 12 face each other (i.e., the flange 46d of the side plate 46, the end of the flange of the top plate 44, and the end of the flange 48a of the bottom plate 48). The load from the outwardly extending portion (wide portion) of the crash box 18 and the outrigger 30 in the vehicle width direction is applied to the front end of this oblique portion (the flange 46c of the side plate 46 and the flange 44b of the top plate 44). This structure allows the triangular gusset 40 to input the inward load in the vehicle width direction to the front side member 12. The triangular gusset 40, which is formed three-dimensionally with the top plate 44, the side plate 46, and the bottom plate 48, has an increased strength against the load.

Figure 3:
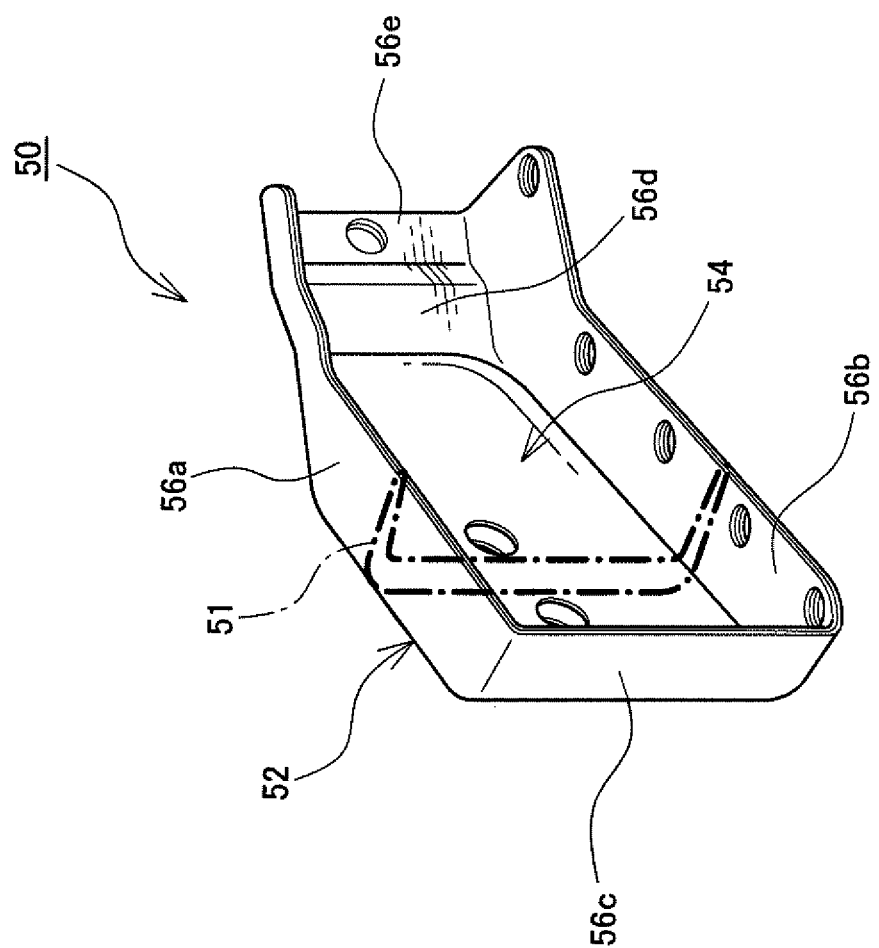
FIG. 3 is a perspective view of a reinforcing patch according to the embodiment.

The vehicle further includes a reinforcing patch 50 that is a reinforcement, behind the side plate 46 forming a part of the oblique portion of the triangular gusset 40. FIG. 3 is a perspective view of the reinforcing patch 50 and illustrates a sectional view of the reinforcing patch 50 by a dot-dash line 51. The reinforcing patch 50 includes two patches 52 and 54 formed of bent steel plates, which are integrally formed into a single three-dimensional member. The reinforcing patch 50 is formed as a patch attached to the side plate 46 of the triangular gusset 40 and therefore has a shape corresponding to the shape of the side plate 46. Specifically, the reinforcing patch 50 includes flanges 56a, 56b, 56c, 56d, and 56e disposed around the substantially rectangular planar side face. Among these flanges, the flanges 56a, 56b, 56c, and 56d are opposite to the flanges 46a, 46b, 46c, and 46d, respectively, of the side plate 46 of the triangular gusset 40. The flange 56e is disposed outward of the flange 56d and is directly opposite the side face of the front side member 12.

The reinforcing patch 50 is fixed to the rear face of the side plate 46 of the triangular gusset 40 by means of the bolts and nuts 58. In this fixed state, the flanges 46c and 46d of the side plate 46 are slightly spaced from the flanges 56c and 56d of the reinforcing patch 50, respectively. The flange 56e is slightly spaced from the side face of the front side member 12. This structure prevents the reinforcing patch 50 from transmitting a load during normal operations and allows the reinforcing patch 50 to transmit a load only when the vehicle body structure is distorted, for example. The load is partially transmitted from the reinforcing patch 50 to the front side member 12 via the flange 56d of the reinforcing patch 50 through the flange 46d of the triangular gusset 40. The reinforcing patch 50 further transmits a load directly to the front side member 12 via the flange 56d. The reinforcing patch 50, which is formed three-dimensionally by the two patches 52 and 54 and includes the flanges 56a, 56b, 56e, 56d, and 56e, has high rigidity and therefore does not deform easily when a load is applied to the reinforcing patch 50.

The vehicle further includes an engine compartment cross member 70 disposed inward of the front side member 12 in the vehicle width direction. The engine compartment cross member 70 is a cross member that connects the front side member 12 on the left in the vehicle width direction and the front side member on the right in the vehicle width direction. While shown only partially in the drawing, the engine compartment cross member 70 has a frame shape having a large cavity 72 inside the frame. The engine compartment cross member 70 supports a power control unit (PCU) in which an inverter and a voltage booster are mounted and a drive motor that receives power supply from the PCU in this cavity 72.

The engine compartment cross member 70, similar to the front side member 12, is formed of a combination of two bent steel plates to have a rectangular sectional shape. While not shown in the drawing, an outer face of the engine compartment cross member 70 is fixed to the inner side face of each front side member 12 by means of welding or bolts and nuts. The engine compartment cross member 70 thus functions as a side member load transmission member for transmitting a load between the front side member 12 on the left side in the vehicle width direction and the front side member on the right side.

The engine compartment cross member 70 includes, in a portion of the engine compartment cross member 70 facing the front side member 12, a recessed portion 74 that is recessed further inward relative to surrounding portions. The recessed portion 74 is a slot-like recess formed uniformly in the vertical direction (that is, in the vehicle height direction corresponding to a direction from toward the viewer of the sheet to the depth of the sheet). As illustrated in FIG. 1, this recessed portion 74 is disposed further rearward with respect to both the position where the flange 46d of the triangular gusset 40 is opposite to the side face of the front side member 12 and the position, near this position, where the flange 46d of the triangular gusset 40 is opposite the side face of the flange 56e of the reinforcing patch 50. The recessed portion 74 thus serves as a portion where the front side member 12, when folded inwardly, engages, as will be described below.

A process of a crash of the motor vehicle 10 will be described below in an example case of a small overlap crash. In small overlap crashes, approximately ¼ of an end portion in the vehicle width direction of the motor vehicle 10 impacts against a frontal barrier (obstacle).

In a small overlap crash of the motor vehicle 10 on the left side in the vehicle traveling direction, the bumper reinforcement 26 is first pressed rearward to start plastic deformation and also partially transmits the load to the crash box 18. As the plastic deformation of the bumper reinforcement 26 progresses to decrease the amount of impact absorption, the load input to the crash box 18 increases. Upon application of a large load, the crash box 18 plastically deforms from the plurality of recessed beads 20a and is longitudinally crushed to thereby partially absorb energy of the crash.

The crash box 18 serves as a load transmission member; therefore the load is input through the crash box 18, in the portions behind the crash box 18. Specifically, a rearward load is input, via the first connection plate 14, to the front end of the front side member 12. Further, the rearward load is also input, via the first connection plate 14, to the triangular gusset 40. When the crash box 18 deforms and comes into contact with the outrigger 30, the load is also input to the outrigger 30. These input loads increase with a decrease in the amount of impact absorption by the crash box 18.

As the outrigger 30 is a rigid member, the amount of deformation is small. The outrigger 30 is also configured as a load transmission member and transmits a large amount of loads to the triangular gusset 40. The triangular gusset 40, which is also a rigid member, can efficiently transmit the loads. As there are no objects behind the triangular gusset 40, loads input to the triangular gusset 40 are transmitted to the side face of the front side member 12 to which the triangular gusset 40 is joined. In particular, significant loads are input to a portion where the rear end of the triangular gusset 40 (the flange 46d of the side plate 46, a portion near the rear end of the flange of the top plate 44, and a portion near the rear end of the flange 48a of the bottom plate 48) is in contact with the front side member 12. The load applied from the triangular gusset 40 to the front side member 12 at this portion includes a rearward component and an inward component in the vehicle width direction. On the other hand, the front side member 12 applies, as a reaction, a forward force and an outward force in the vehicle width direction to the triangular gusset 40. The triangular gusset 40 thus undergoes a strong compression force.

Depending on the destruction state of the entire body, an inward load in the vehicle width direction may be applied to the crash box 18 or the outrigger 30. In this case, the inward load transmitted from the triangular gusset 40 to the front side member 12 further increases.

The load acting on the side plate 46 of the triangular gusset 40 is partially transmitted, via the bolts and nut 58, to the reinforcing patch 50. When the triangular gusset 40 slightly deforms, the flange 56c of the reinforcing patch 50 receives a load from the outrigger 30 through the flange 46c of the triangular gusset 40. After the flange 56e of the reinforcing patch 50 comes into contact with the side face of the front side member 12, the reinforcing patch 50 transmits the load directly to the side face of the front side member 12. At this time, the reinforcing patch 50 functions similarly to the oblique portion of the triangular gusset 40.

A large rearward load is applied, via the first connection plate 14, to the front end of the front side member 12. A large rearward load and a large inward load in the vehicle width direction are further applied to the side face of the front side member 12 from the flange 46d of the triangular gusset 40 and the flange 56e of the reinforcing patch 50. When the magnitude of the inward load in the vehicle width direction exceeds the limit value, the front side member 12 plastically deforms in a portion near the flange 46d and the flange 56; to cause inward folding in which the front side member 12 is folded inward in the vehicle width direction. Once the inward folding starts, the force from the front end of the front side member 12 further works to accelerate the inward folding, so that the inward folding progresses. Subsequently, the inwardly folded portion reaches the engine compartment cross member 70 disposed inward of the front side member 12 in the vehicle width direction. At this stage, the barrier has further intruded into the left front portion of the motor vehicle 10. With the front end of the front side member 12 being pushed by the barrier, the inwardly folded portion also moves rearward. However, the inwardly folded portion, reaching the recessed portion 74 of the engine compartment cross member 70, engages the recessed portion 74 and cannot slide any further along the side face of the engine compartment cross member 70. Consequently, the front side member 12 continues to transmit a large rearward load and a large inward load in the vehicle width direction to a portion of the engine compartment cross member 70 near the recessed portion 74.

A rearward load and an inward load in the vehicle width direction have been applied, through the front side member 12, to the engine compartment cross member 70 since before the inward folding of the front side member 12. After the inward folding of the front side member 12, the inward load in the vehicle width direction increases. The engine compartment cross member 70 functions as a load transmission member and transmits a part of the load input to the engine compartment cross member 70 to the front side member on the opposite side. The entire frame of the motor vehicle 10 thus receives a lateral force toward the opposite side of the barrier so that the motor vehicle 10 itself moves away from the barrier.

Figure 4:
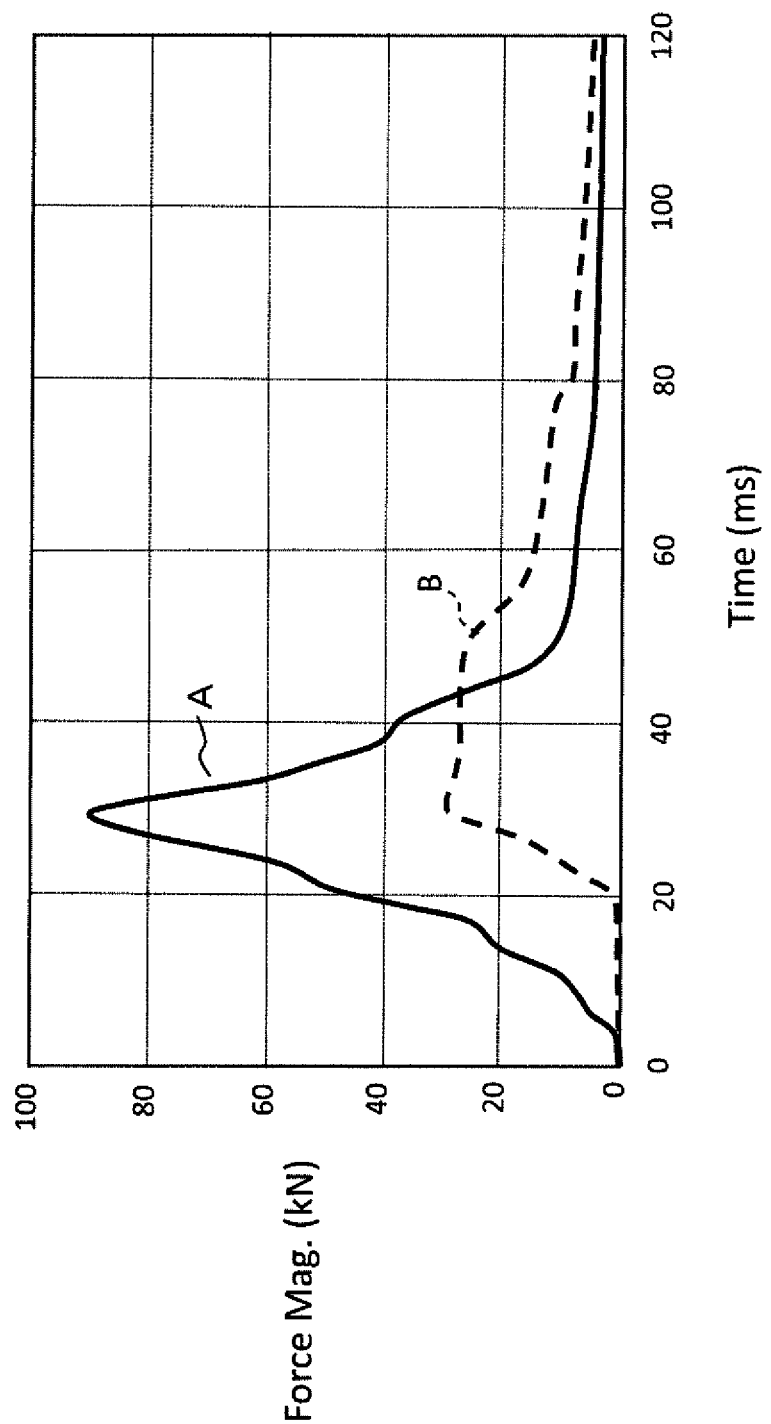
FIG. 4 shows a change over time of load input to a front side member by the triangular gusset and the reinforcing patch according to the embodiment.

As described above, the triangular gusset 40 and the reinforcing patch 50 play an important role in causing the inward folding of the front side member 12. FIG. 4 schematically shows a change over time in the inward force in the vehicle width direction, which is input to the front side member 12 by the flange 46d of the triangular gusset 40 and the flange 56e of the reinforcing patch 50 in a small overlap crash. In FIG. 4, the horizontal axis indicates time (ms) elapsed from the crash and the vertical axis indicates magnitude of force (kN). A graph indicated by a solid line A shows a load from the flange 46d of the triangular gusset 40, and a graph indicated by a broken line B shows load from the flange 56e of the reinforcing patch 50.

As shown in FIG. 4, immediately after the crash (around 0 ms to 3 ms), almost no loads are transmitted to the triangular gusset 40 or to the reinforcing patch 50. However, after about 3 ms, a load starts to be input to the triangular gusset 40 through the crash box 18, and then the triangular gusset 40 starts to transmit the load to the front side member 12. Subsequently, a load from the outrigger 30 is further added to the load, thereby increasing the load from the triangular gusset 40 to the front side member 12. From around 20 ms, a load from the reinforcing patch 50 also starts to be input to the front side member 12. The load from the triangular gusset 40 reaches the maximum value (about 90 kN) around 30 ms, and thereafter decreases rapidly. The load from the reinforcing patch 50 also reaches the maximum value (about 301(N) around 30 ms but thereafter decreases gently. After about 45 ms, the load from the triangular gusset 40 is smaller than the load from the reinforcing patch 50.

The time 30 ms when the load becomes maximum corresponds to a timing when the inward folding starts. The front side member 12, when folded inwardly, moves inward, and this decreases the load applied to the front side member 12. As described above, only the load from the triangular gusset 40 is decreased rapidly and the load from the reinforcing patch 50 almost remains unchanged. This is caused by a relationship between the positions where the triangular gusset 40 and the reinforcing patch 50 are in contact with the front side member 12 and the position of the inward folding. Assuming, for example, that inward folding of the front side member 12 occurs between the flange 46d of the triangular gusset 40 and the flange 56e of the reinforcing patch 50. At this time, the contact angle between the flange 46d of the triangular gusset 40 and the front side member 12 becomes small, whereas the contact angle between the flange 56e of the reinforcing patch 50 and the front side member 12 becomes large (closer to a right angle). Consequently, the load applied to the front side member 12 from the flange 46d of the triangular gusset 40 is relatively small and the load applied to the front side member 12 from the flange 56e of the reinforcing patch 50 is relatively large.

In the example shown in FIG. 4, the inward folding of the front side member 12 starts when the load from the triangular gusset 40 reaches about 90 kN and the load from the reinforcing patch 50 reaches about 30 kN. In other words, the front side member 12 starts the inward folding when an inward load of about 120 kN in total in the vehicle width direction is applied to the front side member 12. In this case, the ability of the triangular gusset 40 to bear a load of 90 kN is simply required, although safety factors must be considered. However, without the reinforcing patch 50, the triangular gusset 40 alone would need to have ability to bear a load of 120 kN.

As described above, the reinforcing patch 50 is useful in supplementing strength of the triangular gusset 40. When a common platform is shared among a plurality of types of vehicles in vehicle manufacturing, for example, it is assumed that an identical triangular gusset 40 is used irrespective of the vehicle weight. This may lead to a situation where the triangular gusset 40 which has been used for conventional lightweight vehicles must be used for developing a new type vehicle having an increased weight due to a large amount of batteries mounted thereon. In such a situation, the reinforcing patch 50 can be used to supplement the triangular gusset 40 having insufficient strength. Of course, it is possible to introduce a triangular gusset 40 with high load resistance in expectation of the increased weight. In this case, however, many vehicles would include the triangular gusset 40 having higher performance than required, which would increase the manufacturing costs and the vehicle weight. In light of this, it is acknowledged that introducing the reinforcing patch 50 as appropriate would be useful.

In the example described above with reference to FIG. 4, the load which would start the inward folding of the front side member 12 is estimated by simply summing the load from the triangular gusset 40 and the load from the reinforcing patch 50. For stricter estimation, a difference between the position where the triangular gusset 40 urges the front side member 12 and the position where the reinforcing patch 50 urges the front side member 12 should be considered. If there is no significant difference between these positions, an approximate calculation may be performed while disregarding such a difference.

Various modifications may be made to the present embodiment. For example, while in the example illustrated in FIG. 2, the triangular gusset 40 includes a combination of three steel plates, the side plate 46 to which a significant load is applied may be formed of two steel plates, rather than a single steel plate. Further, the triangular gusset 40 may have any shape which includes a rigid oblique portion to which the largest load is applied.

Various modifications may also be made to the reinforcing patch 50. While in the above example, the reinforcing patch 50 is fastened to the side plate 46 of the triangular gusset 40 with the bolts and nuts 58, the reinforcing patch 50 may be welded to the side plate 46.

The reinforcing patch 50 may have any shape or may be disposed at any position, which make it possible to supplement transmission of a load by the oblique portion of the triangular gusset 40. For example, the reinforcing patch 50 may be disposed forward of the side plate 46 of the triangular gusset 40, rather than rearward of it. Further, the reinforcing patch 50 may cover not only the side plate 46 of the triangular gusset 40 but also a portion of the top plate 44 or the bottom plate 48. In this manner, the reinforcing patch 50 may have any of various structures as a plate-like patch attached to the wall faces of the triangular gusset 40. Alternatively, in place of the reinforcing patch 50, one or more rod-like reinforcements such as cylindrical or prism-like reinforcements (having a solid interior or having a hollow pipe shape) may be used. The reinforcements such as the reinforcing patch 50 may be directly joined to a member disposed before it, such as the outrigger 30, or may be directly joined to the side face of the front side member 12, or may be directly joined to both. If a reinforcement is joined to a member other than the triangular gusset 40, this reinforcement may or may not be further joined to the triangular gusset 40.

In the above example structure, the reinforcing patch 50 transmits a part of the load from its flange 56*d* via the flange 46*d* of the triangular gusset 40 to the front side member 12 and transmits the remaining load from its flange 56*e* directly to the front side member 12 near the flange 46*d* of the triangular gusset 40. Alternatively, the reinforcing patch 50 may be configured to transmit all of the load to be transmitted by the reinforcing patch 50 to the front side member 12 via the triangular gusset 40. In this case, the inward load in the vehicle width direction is applied to the front side member 12 in a concentrated manner, so that the load which is required for starting the inward folding of the front side member 12 may be reduced. This may further lower the load bearing capacity of the triangular gusset 40 and the reinforcing patch 50, thereby facilitating manufacture of the triangular gusset 40 and the reinforcing patch 50. Alternatively, the reinforcing patch 50 may be configured to transmit to the front side member 12 all of the load to be transmitted by the reinforcing patch 50 directly. In this case, the reinforcing patch 50 is configured to transmit the load to the front side member 12 at a position near the position where the triangular gusset 40 transmits the load to the front side member 12 (i.e., the smallest distance between the outer edges of load transmitting portions of the triangular gusset 40 and the reinforcing patch 50 is, for example, within 70 mm, within 50 mm, or within 30 mm). In this configuration, the triangular gusset 40 and the reinforcing patch 50 may disperse and apply the load to the front side member 12 over a relatively long period of time. Simultaneously, the triangular gusset 40 and the reinforcing patch 50 may also apply the load in a certain degree of concentrated manner to thereby cause the front side member 12 to be folded inwardly.

While the present embodiment has been described with the motor vehicle 10, vehicles having no drive motors and driven only by internal combustion engines, or hybrid vehicles driven by both drive motors and internal combustion engines may also be implemented. In this ease, the load transmission member disposed between the side members (side-member-side-member load transmission member) may be, in place of the engine compartment cross member 70, an elongated cross member or the internal combustion engine itself.

While a small overlap crash has been described in the above example, the vehicle structure according to the present embodiment may have similar functions in load transmission and impact absorption in other forms of crash.

REFERENCE SIGNS LIST

10 motor vehicle, 12 front side member, 12*a* front portion, 14 first connection plate, 16 radiator support, 18 crash box, 20 body part, 20*a* recessed bead, 22 second connection plate, 24 third connection plate, 26 bumper reinforcement, 28, 58 nut, 30 outrigger, 40 triangular gusset, 42, 51 dot-dash line, 44 top plate, 44*a*, 44*b*, 46*a*, 46*b*, 46*c*, 46*d*, 48*a*, 56*a*, 56*b*, 56*c*, 56*d*, 56*e* flange, 46 side plate, 48 bottom plate, 50 reinforcing patch, 52, 54 patch, 70 engine compartment cross member, 72 cavity, 74 recessed portion.

The invention claimed is:

1. A vehicle front structure, comprising:
   a front side member disposed on each of opposite lateral sides in a front portion of a vehicle;
   a load transmission member disposed forward of the front side member, the load transmission member including a wide portion extending further outward with respect to the front side member and transmitting rearward a load applied from forward;
   a gusset having a rear end attached to an outer side face of the front side member, the gusset having an oblique portion extending forward and outward from the rear end, the oblique portion having a front end that is attached to a rear face of the wide portion of the load transmission members; and
   a reinforcement attached to the oblique portion of the gusset, the reinforcement having a shape extending from a vicinity of the rear end toward a front end of the gusset,
   wherein the reinforcement comprises a front flange configured to receive a load from the load transmission member, and a rear flange configured to come into contact with the outer side face of the front side member to transmit the load received by the front flange to the outer side face of the front side member, and the rear flange comes into contact with the front side member at a position spaced apart from the rear end of the gusset.

2. The vehicle front structure according to claim 1, further comprising:
   a side-member-side-member load transmission member disposed inward of the front side members on the opposite lateral sides, the side-member-side-member load transmission member being configured to transmit a load between the front side members, wherein the side-member-side-member load transmission member includes, on faces opposite the respective front side members, recessed portions each extending along a vehicle height and being disposed further rearward with respect to a portion of the front side member where the rear end of the gussets is attached.

3. The vehicle front structure according to claim 1, wherein the reinforcement comprises two overlapped patches, each of which is a bent steel plate.

4. The vehicle front structure according to claim 1, wherein the front flange of the reinforcement is configured to receive the load from the load transmission member via the front end of the gusset, the vehicle front structure further comprises a second rear flange configured to come into contact with the rear end of the gusset to transmit the load received by the front flange to the outer side face of the front side member via the rear end of the gusset, and the front flange, the rear flange and the second rear flange of the reinforcement are attached to the gusset at positions that are spaced apart respectively from the front end of the gusset, the outer side face of the front side member, and the rear end of the gusset.

* * * * *